United States Patent Office 2,785,043
Patented Mar. 12, 1957

2,785,043

PROCESS FOR THE MANUFACTURE OF THREADS OR BANDS FROM RUBBER HYDROCHLORIDE

Gerrit Schuur, The Hague, Netherlands, assignor to Rubber-Stichting, Delft, Netherlands, a Netherlands foundation No Drawing. Application September 28, 1954,
Serial No. 458,950

Claims priority, application Netherlands
November 11, 1953

6 Claims. (Cl. 18—54)

It is known (U. S. Patent 2,650,389) to manufacture rubber hydrochloride-threads by dispersing finely divided rubber hydrochloride in a plastifier, forcing this mixture through a narrow aperture, gelatinizing the thread-like product at increased temperature and thereupon orientating it by stretching. Finally the superfluous plastifier is removed by extraction.

This process has the disadvantage that by this extraction all substances soluble in the extraction agent, such as e. g. dyestuffs and stabilizers, are removed.

According to the present invention finely divided rubber hydrochloride is dispersed in a volatile organic liquid with a boiling point below 185° C., the mixture is extruded through an opening, the thread or band-like product is gelatinized at increased temperature, stretched and thereupon the organic liquid is evaporated and, if desired, the product is stretched once again.

The rubber hydrochloride used as starting material should be finely divided, e. g. as obtained by hydrochlorination of latex according to my copending U. S. application Serial No. 368,013, filed July 14, 1953, now abandoned. This finely-divided rubber hydrochloride is insoluble in hydrocarbons and many other organic solvents but when dispersed therein the rubber hydrochloride particles tend to swell and, upon heating, the dispersions gel or gelatinize.

As organic liquids may be used all organic liquids, such as e. g. alkyl, aryl, aralkyl compounds, chlorinated hydrocarbons, alcohols, ethers, esters and ketones or mixtures thereof, all insofar as the boiling point is below 185° C.

It is, however, recommendable to use liquids or a mixture of liquids having a boiling point which is not much lower than the gelatinizing temperature of the mixture and which furthermore can be evaporated relatively rapidly, such as e. g. decane, petrol, benzene, toluene, xylene, dichloro ethane, chlorobenzene, amyl alcohol, dioxane, tetra hydrofurane, ethyl acetate, n-amyl acetate, methyl hexyl ketone, cyclo hexanone and mesityl oxide.

The quantity of organic liquid in which the rubber hydrochloride is dispersed may vary between 40 to 200 parts by vol. to 100 parts by vol. of rubber hydrochloride. Preferably, however, 60 to 90 parts by vol. are used. Below 40 parts by vol. of liquid the mixture cannot be extruded anymore and over 200 parts by vol. unnecessarily much liquid is used.

The mixture is extruded through a narrow opening. Dependent on the shape of this opening the final product has the form of a thread or a strip.

The formed product is heated until gelatinization or gelling occurs. This heating may take place in the air as well as in a liquid. After cooling the product may be stretched, orientation occurring. It is recommendable to subject the product to a stretch of at least 100%. A stretch over 800% generally is not desirable. Thereupon the organic liquid is evaporated at increased temperature, if desired, under reduced pressure. Finally the product may be stretched once again. After gelatinization, if desired, the organic liquid may first be evaporated and the product thereupon orientated.

The usual substances, such as dyestuffs, stabilizers, plastifiers, fillers may be added to the mixture of rubber hydrochloride and organic liquid.

The invention is further elucidated by the following examples:

*Example I*

20 g. of rubber hydrochloride powder prepared from latex were dispersed in 15 g. of tetra hydrofurane (boiling point 65° C.). This mixture was extruded through a round opening with a diameter of 1 mm. and heated to 105° C. during 5 seconds. The thread obtained was orientated 500% and thereupon the tetra hydrofurane was evaporated at 40° C. A reasonably strong thread was obtained.

*Example II*

10 g. of rubber hydrochloride powder prepared from latex were dispersed in 7 g. of acetyl acetic ester (boiling point 181° C.). This mixture was extruded through a round opening with a diameter of 1 mm. and heated to 135° C. during 5 seconds. The thread obtained was orientated 600% and thereupon freed from acetyl acetic ester in a stove of 60° C. A reasonably strong thread was obtained.

*Example III*

50 g. of rubber hydrochloride powder prepared from latex were mixed with 30 g. of methyl hexyl ketone (boiling point 172° C.). The mixture obtained was extruded through a flat profiled opening with a width of 8 mm. and gelatinized at 130° C. in a glycerol bath. After gelatinization the band obtained was cooled and thereupon the solvent was removed by drying at 60° C. in a circulation stove during 8 hours. After drying the band was orientated 400% in water of 100° C. The band then had a width of 2.5 mm. and a section area of 0.8 mm.² The tensile strength was approximately 1400 kg./cm.², the stretch at rupture 25%.

*Example IV*

Of 1000 g. of rubber hydrochloride powder prepared from latex, 550 g. of amyl acetate (boiling point 142° C.), 60 g. of dibutyl phthalate as a plasticizer and 20 g. of 5-chloro-2 hydroxy benzophenone as a stabilizer a mixture was made in a mixer. This mixture was extruded through a round opening with a diameter of 1 mm. and gelatinized by heating in a glycerol bath of 130° C. during 5 seconds. After cooling the thread obtained was orientated 600% at room temperature. The thread was heated at 60° C. in a circulation stove during 8 hours, so that the amyl acetate evaporated. Thereupon again 25% stretching took place in boiling water. The tensile strength was about 2500 kg./cm.², the stretch at rupture 30%.

*Example V*

30 g. of rubber hydrochloride powder prepared from latex were dispersed in 17 g. of decane (boiling point 174° C.) and 1 g. of Vulcafor Fast Blue BS. The formed mixture was extruded through a round extrusion opening of 0.5 mm. diameter and thereupon gelatinized by heating in a glycerol bath at 145° C. during 5 second. The formed thread was dried by heating it at 50° C. in a vacuum stove during 8 hours. The dried thread was orientated 500% in a water bath of 100° C. The tensile strength was about 3300 kg./cm.², the stretch at rupture 30%.

Vulcafor Fast Blue BS is the copper complex of phthalocyanine as brought on the market by Imperial Chemical Industries Limited.

Example VI 30 g. of rubber hydrochloride powder prepared from latex were mixed with 18 g. of amyl alcohol (boiling point 128° C.). The mixture was extruded through a round extrusion opening of 1 mm. diameter and was thereupon gelatinized by heating in a glycerol bath at 135° C. during 5 seconds. The formed thread was orientated 600% and thereupon dried by heating in a circulation stove at 60° C. during 8 hours. Thereupon the thread was again stretched 40% in boiling water. The tensile strength was 2400 kg./cm.$^2$. The stretch at rupture was 25%.

Example VII 10 g. of rubber hydrochloride powder prepared by hydrochlorinating latex were mixed with 7 g. of chlorobenzene (boiling point 132° C.). The mixture obtained was extruded through a round opening with a diameter of 1 mm. The thread thus formed was heated to 100° C. during 30 seconds, due to which the rubber hydrochloride gelatinized. After cooling the thread was orientated by stretching 600% at room temperature. The chlorobenzene was removed from the thread by evaporation at 50° C. in a vacuum of 20 mm. during one hour. Thereupon the thread was again stretched 30% at 100° C. The tensile strength amounted to 2500 kg./cm.$^2$, the stretch at rupture to 30%.

Example VIII 50 g. of rubber hydrochloride powder prepared from latex were mixed with 27 g. of xylene (boiling point 138° C.) and 3 g. of dibutyl phthalate. This mixture was extruded through a round opening with a diameter of 1 mm. The thread obtained was thereupon heated in a glycerol bath at 135° C. during 15 seconds. Thereupon the xylene was removed by evaporation in a circulation drying stove at 60° C. during 4 hours. After the xylene had evaporated the thread was orientated at 100° C. by stretching 600%. The tensile strength of the thread then was 3500 kg./cm.$^2$ and the stretch at rupture 25%.

What I claim is:

1. In the production of shaped threads and strips from rubber hydrochloride, the process which comprises dispersing in a volatile organic liquid having a boiling point below 185° C. a finely-divided rubber hydrochloride, produced by the hydrochlorination of rubber latex, in proportions to make an extrudable mixture, extruding the mixture through a die, gelatinizing the extruded shape by heating, stretching with a stretch of at least 100% and evaporating the volatile solvent from the shaped product.

2. The process of claim 1 wherein the rubber hydrochloride is mixed with the organic liquid in the proportions of from about 40 to 200 parts by volume of organic liquid to 100 parts per volume of the rubber hydrochloride.

3. The process of claim 1 wherein the dispersion of rubber hydrochloride is extruded into a bath of organic liquid heated to gelatinizing temperatures in order to gelatinize the shaped mass.

4. The process of claim 1 wherein the extrudable mass contains an added material soluble in the organic liquid and this added material remains in the finished product.

5. The process of claim 1 wherein the extruded shape is stretched both before and after the evaporating step wherein the organic liquid is removed, the total stretch being between 100 and 800%.

6. The process of claim 1 wherein the extruded shape is stretched after the evaporating step.

References Cited in the file of this patent
UNITED STATES PATENTS 2,210,161   Allen _____ Aug. 6, 1940